(12) United States Patent
Iwata

(10) Patent No.: US 12,545,275 B2
(45) Date of Patent: Feb. 10, 2026

(54) VEHICLE

(71) Applicant: SUBARU CORPORATION, Tokyo (JP)

(72) Inventor: Satoru Iwata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 87 days.

(21) Appl. No.: 18/637,192

(22) Filed: Apr. 16, 2024

(65) Prior Publication Data

US 2024/0359700 A1    Oct. 31, 2024

(30) Foreign Application Priority Data

Apr. 25, 2023   (JP) .................................. 2023-071367

(51) Int. Cl.
| | | |
|---|---|---|
| *B60W 50/12* | (2012.01) | |
| *B60K 35/10* | (2024.01) | |
| *B60W 40/08* | (2012.01) | |
| *G01N 33/497* | (2006.01) | |

(52) U.S. Cl.
CPC ............ *B60W 50/12* (2013.01); *B60K 35/10* (2024.01); *B60W 40/08* (2013.01); *G01N 33/4972* (2013.01); *B60W 2040/0836* (2013.01); *B60W 2540/24* (2013.01)

(58) Field of Classification Search
CPC .. G01N 33/4972; G01N 21/05; A61B 5/4845; B60K 28/066; G02B 27/0093; B60Q 1/56; G07C 9/00174
See application file for complete search history.

(56) References Cited

U.S. PATENT DOCUMENTS

| | | | | |
|---|---|---|---|---|
| 2007/0077176 A1* | 4/2007 | Lambert | ................ | G01N 21/05 422/82.05 |
| 2013/0285816 A1* | 10/2013 | Sezanayev | ......... | G07C 9/00174 340/576 |
| 2014/0266738 A1* | 9/2014 | Wang | ....................... | B60Q 1/56 340/576 |
| 2017/0131261 A1* | 5/2017 | Biondo | .............. | G01N 33/4972 |
| 2020/0207358 A1* | 7/2020 | Katz | ................... | G02B 27/0093 |
| 2023/0041464 A1* | 2/2023 | Jung | .................... | B60K 28/066 |
| 2023/0067020 A1* | 3/2023 | Ono | ...................... | A61B 5/4845 |
| 2024/0361298 A1* | 10/2024 | Iwata | ................. | G01N 33/4972 |

FOREIGN PATENT DOCUMENTS

JP          2005-118177 A     5/2005

* cited by examiner

*Primary Examiner* — Yuri Kan
(74) *Attorney, Agent, or Firm* — TROUTMAN PEPPER LOCKE LLP

(57) ABSTRACT

A vehicle includes an outer panel, an inner panel, and an alcohol sensor. The outer panel is opposed to the outside of the vehicle. The inner panel is opposed to a vehicle compartment of the vehicle and has an opening. The alcohol sensor is provided in a space between the outer panel and the inner panel and spaced apart from the outer panel. The alcohol sensor is configured to detect an alcohol component included in exhaled breath of an occupant of the vehicle. The opening is provided on the inner panel at a location corresponding to the alcohol sensor, and couples the vehicle compartment and the space.

7 Claims, 6 Drawing Sheets

VEHICLE

CROSS-REFERENCE TO RELATED APPLICATIONS

The present application claims priority from Japanese Patent Application No. 2023-071367 filed on Apr. 25, 2023, the entire contents of which are hereby incorporated by reference.

BACKGROUND

The disclosure relates to a vehicle configured to detect an alcohol component included in exhaled breath of an occupant of the vehicle.

Some vehicles have an alcohol sensor that determines whether an occupant has drunk alcohol. Some alcohol sensors detect an alcohol component included in exhaled breath of the occupant. For example, Japanese Unexamined Patent Application Publication No. 2005-118177 discloses a technique in which a heater is provided, and a temperature of the alcohol sensor is so adjusted that the alcohol sensor operates within a predetermined operation temperature range.

SUMMARY

An aspect of the disclosure provides a vehicle that includes an outer panel, an inner panel, and an alcohol sensor. The outer panel is opposed to the outside of the vehicle. The inner panel is opposed to a vehicle compartment of the vehicle and has an opening. The alcohol sensor is provided in a space between the outer panel and the inner panel and spaced apart from the outer panel. The alcohol sensor is configured to detect an alcohol component included in exhaled breath of an occupant of the vehicle. The opening is provided on the inner panel at a location corresponding to the alcohol sensor, and couples the vehicle compartment and the space.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
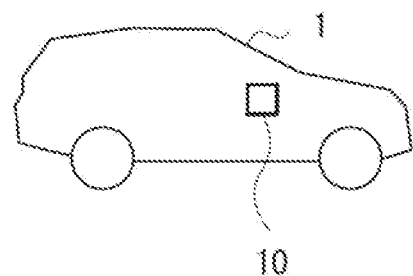
FIG. 1 is an explanatory diagram illustrating a configuration example of a vehicle according to one example embodiment of the disclosure.

What is desired for a vehicle is that an occupant can easily use an alcohol sensor, and that the alcohol sensor is more easily usable.

It is desirable to provide a vehicle that makes it possible for an occupant to easily use an alcohol sensor.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a configuration example of a vehicle 1 according to an example embodiment. The vehicle 1 includes an alcohol sensor 10. The alcohol sensor 10 is configured to detect an alcohol component included in exhaled breath of a person such as a driver who drives the vehicle 1 or an occupant. The alcohol sensor 10 may detect the alcohol component included in the exhaled breath of the driver, based on, for example, blowing of a breath of the driver toward a later-described inlet 10A of the alcohol sensor 10.

Figure 2:
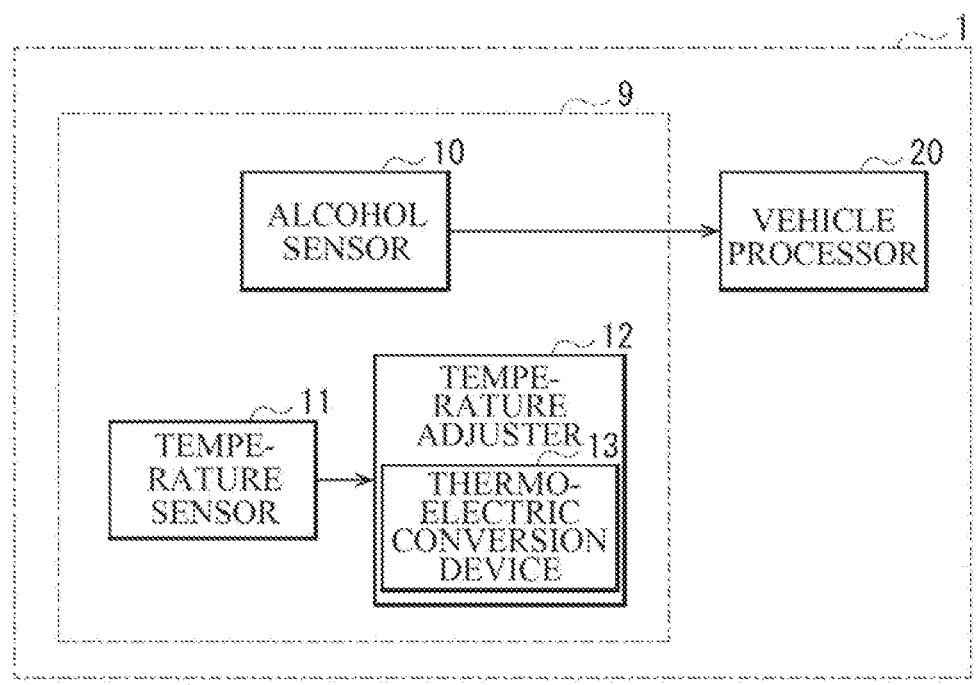
FIG. 2 is a block diagram illustrating a configuration example of the vehicle illustrated in FIG. 1.

FIG. 2 illustrates a configuration example of example components related to the alcohol sensor 10 in the vehicle 1. The vehicle 1 may include the alcohol sensor 10, a temperature sensor 11, a temperature adjuster 12, and a vehicle processor 20. The alcohol sensor 10, the temperature sensor 11, and the temperature adjuster 12 may be provided inside a later-described space 9 in the vehicle 1.

The temperature sensor 11 may be configured to detect a temperature of the alcohol sensor 10.

The temperature adjuster 12 may be configured to so adjust the temperature of the alcohol sensor 10 that the temperature of the alcohol sensor 10 becomes a temperature that is within a predetermined temperature range that allows for a high detection accuracy, based on a result of the detection performed by the temperature sensor 11. In some embodiments, the temperature adjuster 12 may include a thermoelectric conversion device 13 such as a Peltier device. For example, the thermoelectric conversion device 13 of the temperature adjuster 12 may heat the alcohol sensor 10 when the temperature of the alcohol sensor 10 is to be increased, and the thermoelectric conversion device 13 may cool the alcohol sensor 10 when the temperature of the alcohol sensor 10 is to be decreased. It should be noted that any embodiment of the disclosure is not limited thereto. In some embodiments, the temperature adjuster 12 may include a heater that heats the alcohol sensor 10 when the temperature of the alcohol sensor 10 is to be increased, and that refrains from operating when the temperature of the alcohol sensor 10 is to be decreased.

The vehicle processor 20 may be or may include, for example, an electronic control unit (ECU), and may be configured to control the vehicle 1. Based on the result of the detection performed by the alcohol sensor 10, the vehicle processor 20 may allow the vehicle 1 to travel when an amount of the alcohol component included in the exhaled breath of the driver is equal to or less than a predetermined amount. The vehicle processor 20 may prevent the vehicle 1 from traveling when the amount of the alcohol component included in the exhaled breath of the driver is greater than the predetermined amount. For example, the vehicle processor 20 may not allow a power source such as an engine or a motor to start, when the amount of the alcohol component included in the exhaled breath of the driver is greater than the predetermined amount.

Figure 3:
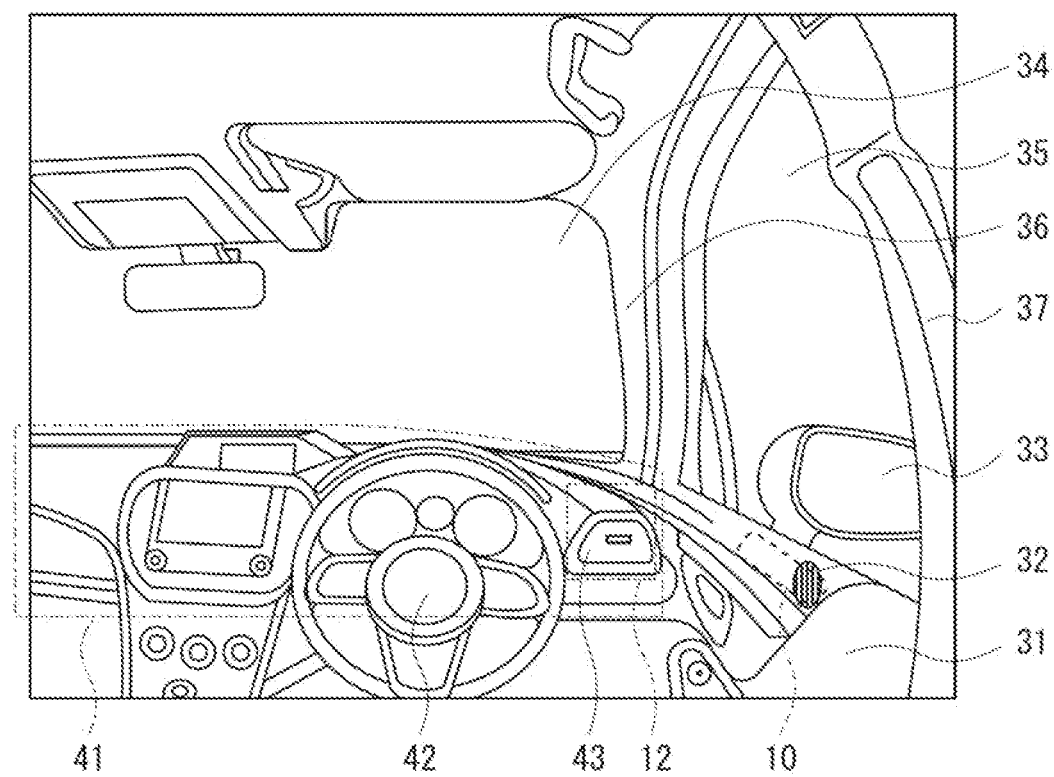
FIG. 3 is an explanatory diagram illustrating a configuration example of a vehicle compartment of the vehicle illustrated in FIG. 1.

FIG. 3 illustrates a configuration example of a vehicle compartment of the vehicle 1. The vehicle 1 may have a driver's seat on the right side of the vehicle 1. It should be noted that any embodiment of the disclosure is not limited thereto, and the driver's seat may be provided on the left side of the vehicle 1. The vehicle 1 may include a door 31, an inlet 32, a door mirror 33, a windshield 34, a side window 35, a front pillar 36, a center pillar 37, a dashboard 41, a steering wheel 42, and an outlet 43. The door 31 may be provided on a side surface of the vehicle 1, and allow the driver to get on and off the vehicle 1. In the example embodiment, the alcohol sensor 10 may be provided inside the door 31. The inlet 32 may provided at a location, of the door 31, corresponding to the alcohol sensor 10. The inlet 32 may be provided at a location where direct sunlight is less likely to hit or unlikely to hit. The inlet 32 may have a color that, for example, less likely to absorb heat or hardly absorbs heat. For example, the driver seated on the driver's seat may blow his/her breath toward the inlet 32, whereby the alcohol sensor 10 provided inside the door 31 may detect the alcohol component included in the exhaled breath of the driver. The door mirror 33 may be provided on an outer surface of the door 31. The windshield 34 may be provided at the front of the vehicle compartment of the vehicle 1. The side window 35 may be provided in the door 31. The front pillar 36 may support a roof of the vehicle 1 at an end of the windshield 34. The center pillar 37 may support the roof of the vehicle 1 in the vicinity of the middle of the side surface of the vehicle 1. The dashboard 41 may be provided at a lower part of the windshield 34 at the front of the vehicle compartment of the vehicle 1. The steering wheel 42 may be provided at the driver's seat. The outlet 43 may blow out air from an air conditioner of the vehicle 1, and may be provided at a location, of the dashboard 41, close to the door 31.

Figure 4:
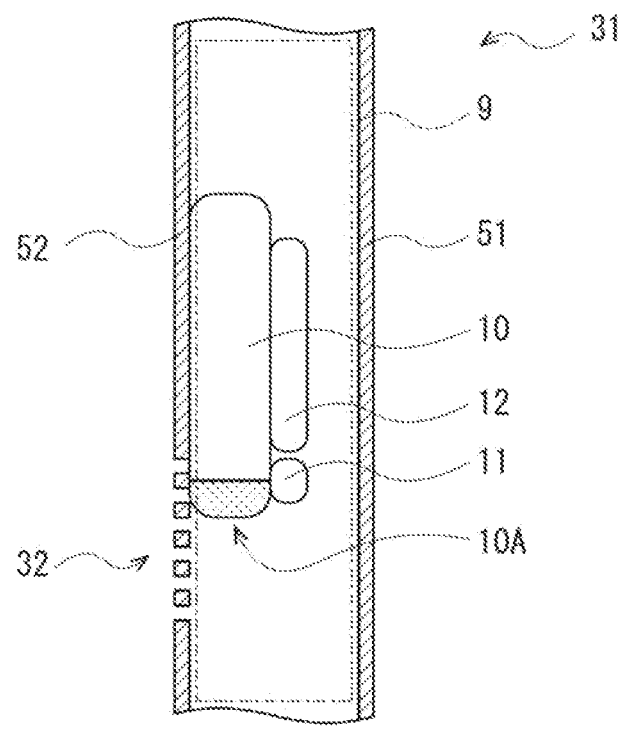
FIG. 4 is a cross-sectional diagram illustrating a configuration example of a door illustrated in FIG. 3.

FIG. 4 illustrates an example of a location of the alcohol sensor 10 in the door 31. In FIG. 4, a space on the left of the door 31 may be the vehicle compartment of the vehicle 1, and a space on the right of the door 31 may be the outside of the vehicle 1. The door 31 may include an outer panel 51 and an inner panel 52. The outer panel 51 may be an outer surface panel of the door 31 opposed to the outside of the vehicle 1. The inner panel 52 may be an inner surface panel of the door 31 opposed to the vehicle compartment of the vehicle 1. A space 9 is provided between the outer panel 51 and the inner panel 52. The alcohol sensor 10, the temperature sensor 11, and the temperature adjuster 12 may be provided in the space 9. The alcohol sensor 10 may be in contact with the inner panel 52. The alcohol sensor 10 is spaced apart from the outer panel 51. The inlet 32 provided on the inner panel 52 is so opened as to couple the vehicle compartment of the vehicle 1 and the space 9. The alcohol sensor 10 may be so disposed that the inlet 10A of the alcohol sensor 10 is positioned close to the inlet 32 of the inner panel 52. In the example embodiment, although it is not limited thereto, the temperature sensor 11 and the temperature adjuster 12 may be so disposed as to be in contact with the alcohol sensor 10. Thus, the temperature adjuster 12 may adjust the temperature of the alcohol sensor 10, based on the result of the detection performed by the temperature sensor 11.

In one embodiment, the outer panel 51 may serve as an "outer panel". In one embodiment, the inner panel 52 may serve as an "inner panel". In one embodiment, the space 9 may serve as a "space". In one embodiment, the alcohol sensor 10 may serve as an "alcohol sensor". In one embodiment, the inlet 32 may serve as an "opening". In one embodiment, the temperature sensor 11 may serve as a "temperature sensor". In one embodiment, the temperature adjuster 12 may serve as a "temperature adjuster". In one embodiment, the vehicle processor 20 may serve as a "processor".

Next, an operation and workings of the vehicle 1 according to the example embodiment will be described.

The example operation of the vehicle 1 will be described with reference to FIG. 2. The alcohol sensor 10 detects the alcohol component included in the exhaled breath of the driver. The temperature sensor 11 may detect the temperature of the alcohol sensor 10. The temperature adjuster 12 may so adjust, based on the result of the detection performed by the temperature sensor 11, the temperature of the alcohol sensor 10 that the temperature of the alcohol sensor 10 becomes the temperature that is within the predetermined temperature range that allows for the high detection accuracy. Based on the result of the detection performed by the alcohol sensor 10, the vehicle processor 20 may allow the vehicle 1 to travel when the amount of the alcohol component included in the exhaled breath of the driver is equal to or less than the predetermined amount, and prevent the vehicle 1 from traveling when the amount of the alcohol component included in the exhaled breath of the driver is greater than the predetermined amount.

As illustrated in FIG. 4, the alcohol sensor 10 is provided in the space 9 between the outer panel 51 and the inner panel 52. The temperature adjuster 12 may so adjust the temperature of the alcohol sensor 10 to be the temperature that is within the predetermined temperature range that allows for the high detection accuracy, based on the result of the detection performed by the temperature sensor 11. For example, after the driver of the vehicle 1 sits on the driver's seat, the driver may blow a breath into the inlet 32 provided on the inner panel 52 without directly touching the alcohol sensor 10. Accordingly, the alcohol sensor 10 may detect the alcohol component included in the exhaled breath of the driver. Based on the result of the detection performed by the alcohol sensor 10, the vehicle processor 20 may allow the vehicle 1 to travel when the amount of the alcohol component included in the exhaled breath of the driver is equal to or less than the predetermined amount, and may prevent the vehicle 1 from traveling when the amount of the alcohol component included in the exhaled breath of the driver is greater than the predetermined amount.

In the vehicle 1 according to the example embodiment, the alcohol sensor 10 is provided in the space 9 between the outer panel 51 and the inner panel 52. This configuration of the vehicle 1 helps to allow the occupant to easily use the alcohol sensor 10. For example, when an alcohol sensor carriable by the occupant is to be used, there is a possibility that the alcohol sensor can be lost or that the alcohol sensor can be broken, making it difficult for the occupant to use the alcohol sensor. In contrast, in the vehicle 1 according to the example embodiment, the alcohol sensor 10 is provided in the space 9 between the outer panel 51 and the inner panel 52, preventing the occupant from removing the alcohol sensor 10 and allowing the occupant not to lose the alcohol sensor 10 accordingly. In addition, the alcohol sensor 10 may be protected by the outer panel 51 and the inner panel 52, making it possible to reduce a possibility of being broken by an external force. Further, the alcohol sensor 10 may not be exposed to direct sunlight, reducing a possibility of breakage of the alcohol sensor 10. Accordingly, this configuration of the vehicle 1 helps to allow the occupant to easily use the alcohol sensor 10.

Further, in the vehicle 1 according to the example embodiment, the alcohol sensor 10 is so disposed in the space 9 as to be spaced apart from the outer panel 51. Thus, a layer of air between the alcohol sensor 10 and the outer panel 51 may serve as a heat insulator, which helps to suppress an influence of the temperature outside the vehicle 1 on the temperature of the alcohol sensor 10. In addition, so disposing the alcohol sensor 10 in the space 9 as to be spaced apart from the outer panel 51 helps to prevent a heat from being trapped around the alcohol sensor 10. This configuration of the vehicle 1 helps to easily adjust the temperature of the alcohol sensor 10 using the temperature adjuster 12. This configuration of the vehicle 1 also helps to allow the temperature of the alcohol sensor 10 to be easily set to the temperature that is within the predetermined temperature range that allows for the high detection accuracy, which in turn allow the occupant to easily use the alcohol sensor 10. For example, when an alcohol sensor carriable by the occupant is to be used and a temperature of the alcohol sensor is low, it is necessary for the occupant to warm the alcohol sensor by, for example, grasping the alcohol sensor with his/her hand, blowing a breath to the alcohol sensor, or bringing the alcohol sensor close to the outlet 43 of the air conditioner, which takes time and effort. In contrast, in the vehicle 1 according to the example embodiment, it is possible to easily adjust the temperature of the alcohol sensor 10 by using the temperature adjuster 12, which helps to save the time and effort of the occupant and allow the occupant to easily use the alcohol sensor 10.

In some embodiments, in the vehicle 1, the alcohol sensor 10 may be provided at a location close to the side window 35 of the door 31 at the driver's seat. The location of the alcohol sensor 10 may be relatively close to a position of the head of the driver, allowing the driver to easily blows his/her breath toward the inlet 32 of the inner panel 52 of the door 31 and allowing the occupant to easily use the alcohol sensor 10 accordingly.

The vehicle 1 according to the foregoing example embodiment includes the outer panel 51, the inner panel 52, the alcohol sensor 10, and the inlet 32. The outer panel 51 is opposed to the outside of the vehicle 1. The inner panel 52 is opposed to the vehicle compartment of the vehicle 1. The alcohol sensor 10 is provided in the space 9 between the outer panel 51 and the inner panel 52 and spaced apart from the outer panel 51, and configured to detect the alcohol component included in the exhaled breath of the occupant of the vehicle 1. The inlet 32 is provided on the inner panel 52 at a location corresponding to the alcohol sensor 10, and couples the vehicle compartment and the space 9. This configuration helps to allow the occupant not to lose the alcohol sensor 10, and to reduce a possibility that the alcohol sensor 10 is broken. Further, for example, the layer of air between the alcohol sensor 10 and the outer panel 51 serves as the heat insulator, allowing the temperature of the alcohol sensor 10 to be easily adjusted. Accordingly, this configuration of the vehicle 1 helps to allow the occupant to easily use the alcohol sensor 10.

In some embodiments, the vehicle 1 may further include the temperature sensor 11 and the temperature adjuster 12. The temperature sensor 11 may be provided in the space 9 and configured to perform the detection of the temperature of the alcohol sensor 10. The temperature adjuster 12 may be provided in the space 9 and configured to adjust the temperature of the alcohol sensor 10, based on a result of the detection performed by the temperature sensor 11. This configuration helps to easily adjust the temperature of the alcohol sensor 10 by using the temperature adjuster 12. Accordingly, this configuration of the vehicle 1 helps to allow the occupant to easily use the alcohol sensor 10.

In some embodiments, the vehicle 1 may further include the vehicle processor 20 configured to control the vehicle 1. The vehicle processor 20 may allow the vehicle 1 to travel when the amount of the alcohol component is equal to or less than the predetermined amount, and prevent the vehicle 1 from traveling when the amount of the alcohol component is greater than the predetermined amount. Accordingly, this configuration helps to reduce a possibility that the driver performs drunk driving.

The vehicle according to the example embodiment includes: the outer panel opposed to the outside of the vehicle; the inner panel opposed to the vehicle compartment of the vehicle; the alcohol sensor provided in the space between the outer panel and the inner panel and spaced apart from the outer panel, and configured to detect the alcohol component included in the exhaled breath of the occupant of the vehicle; and the inlet provided on the inner panel at a location corresponding to the alcohol sensor, and coupling the vehicle compartment and the space. This configuration helps to allow the occupant to easily use the alcohol sensor.

In some embodiments, the vehicle may further include: the temperature sensor provided in the space and configured to perform the detection of the temperature of the alcohol sensor; and the temperature adjuster provided in the space and configured to adjust the temperature of the alcohol sensor, based on a result of the detection performed by the temperature sensor. This configuration helps to allow the occupant to easily use the alcohol sensor.

In some embodiments, the vehicle may further include the vehicle processor configured to control the vehicle, and allow the vehicle to travel when the amount of the alcohol component is equal to or less than the predetermined amount, and prevent the vehicle from traveling when the amount of the alcohol component is greater than the predetermined amount. This configuration helps to reduce a possibility that the driver performs drunk driving.

Figure 5:
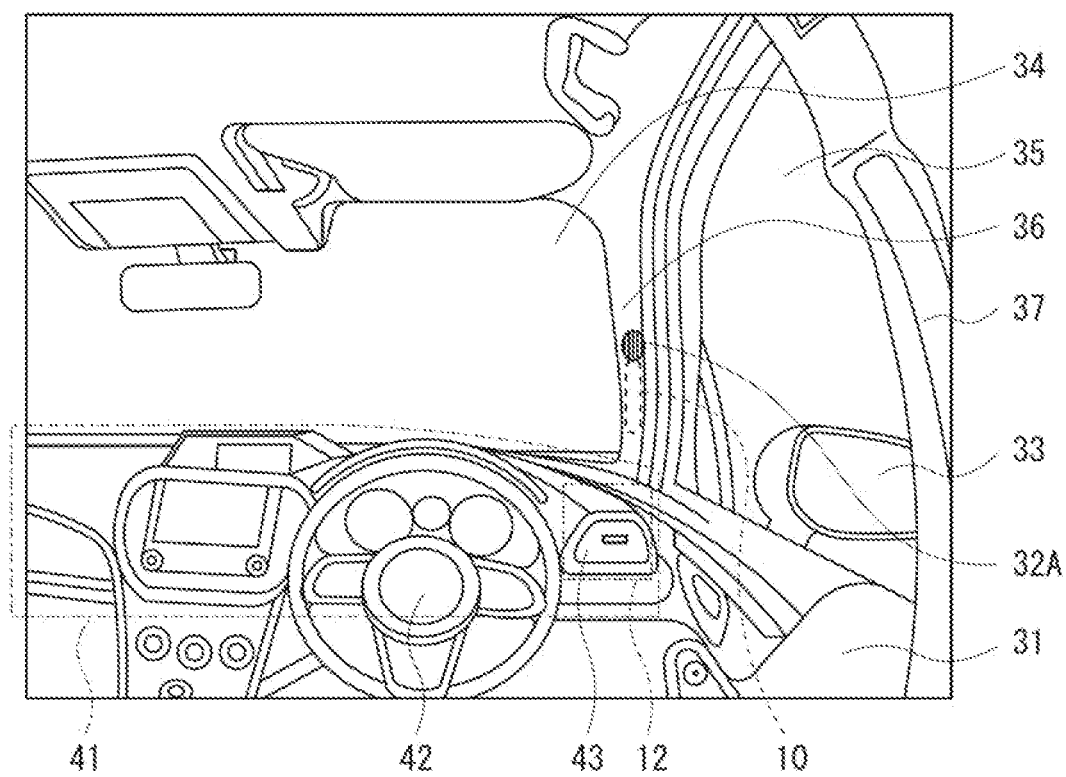
FIG. 5 is an explanatory diagram illustrating a configuration example of the vehicle compartment of the vehicle according to a modification example.

In the above-described example embodiment, the alcohol sensor 10 may be provided inside the door 31, but any embodiment of the disclosure is not limited thereto. In some embodiments, the alcohol sensor 10 may be provided inside the front pillar 36 as illustrated in FIG. 5. The vehicle 1 according to the present modification example may include an inlet 32A. The inlet 32A may be provided at a location, of the front pillar 36, corresponding to the alcohol sensor 10.

In the present modification example, the inlet 32A may be provided at a location in the vicinity of the middle of the front pillar 36 in a longitudinal direction. The inlet 32A may be provided at a location where the direct sunlight is less likely to hit or unlikely to hit. The inlet 32A may have a color that, for example, less likely to absorb heat or hardly absorbs heat. For example, the driver seated on the driver's seat may blow his/her breath toward the inlet 32A, whereby the alcohol sensor 10 provided inside the front pillar 36 may detect the alcohol component included in the exhaled breath of the driver. In this modification example, the alcohol sensor 10 may be provided inside the front pillar 36, but any embodiment of the disclosure is not limited thereto. In some embodiments, the alcohol sensor 10 may be provided inside the center pillar 37.

Figure 6:
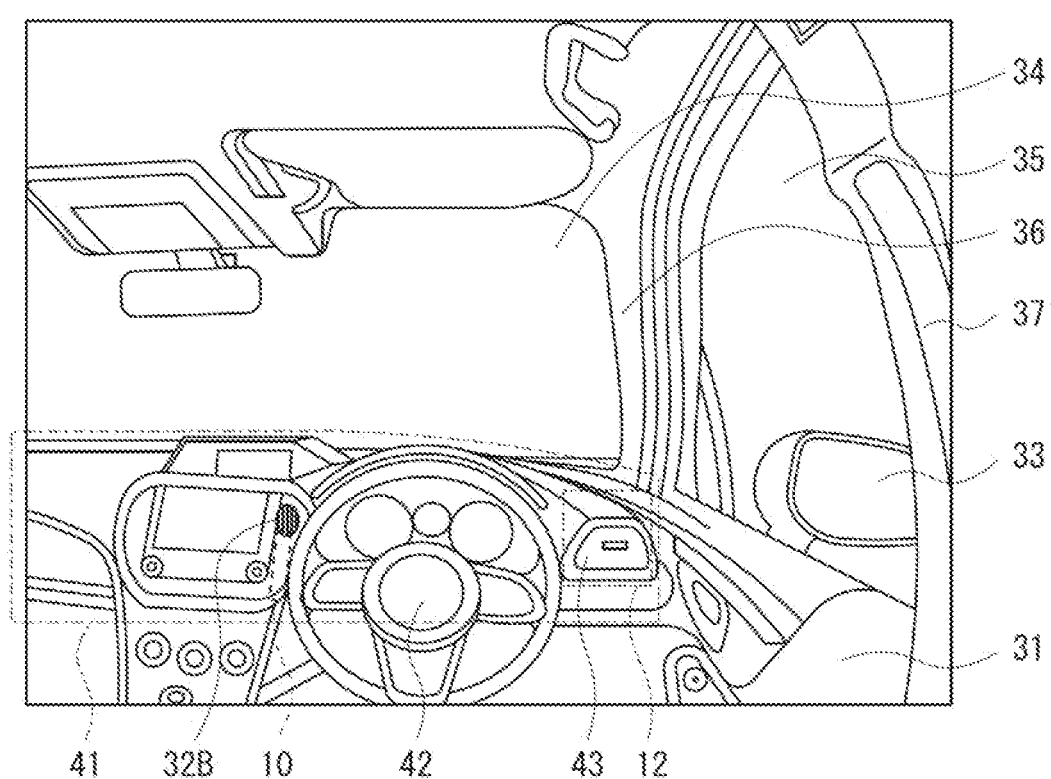
FIG. 6 is an explanatory diagram illustrating a configuration example of the vehicle compartment of the vehicle according to a modification example.

In some embodiments, the alcohol sensor 10 may be provided inside the dashboard 41 as illustrated in FIG. 6. The vehicle 1 according to the present modification example may include an inlet 32B. The inlet 32B may be provided at a location, of the dashboard 41, corresponding to the alcohol sensor 10. In the present modification example, the inlet 32B may be provided at a location, of the dashboard 41, close to the steering wheel 42. The inlet 32B may be provided at a location where the direct sunlight is less likely to hit or unlikely to hit. The inlet 32B may have a color that, for example, less likely to absorb heat or hardly absorbs heat. For example, the driver seated on the driver's seat may blow his/her breath toward the inlet 32B, whereby the alcohol sensor 10 provided inside the dashboard 41 may detect the alcohol component included in the exhaled breath of the driver.

In the above-described example embodiment, the temperature sensor 11 and the temperature adjuster 12 may be provided in the space 9, but any embodiment of the disclosure is not limited thereto. In some embodiments, a temperature sensor and a temperature adjuster may be provided outside the space 9. In the following, a vehicle 1C according to the present modification example will be described in detail.

Figure 7:
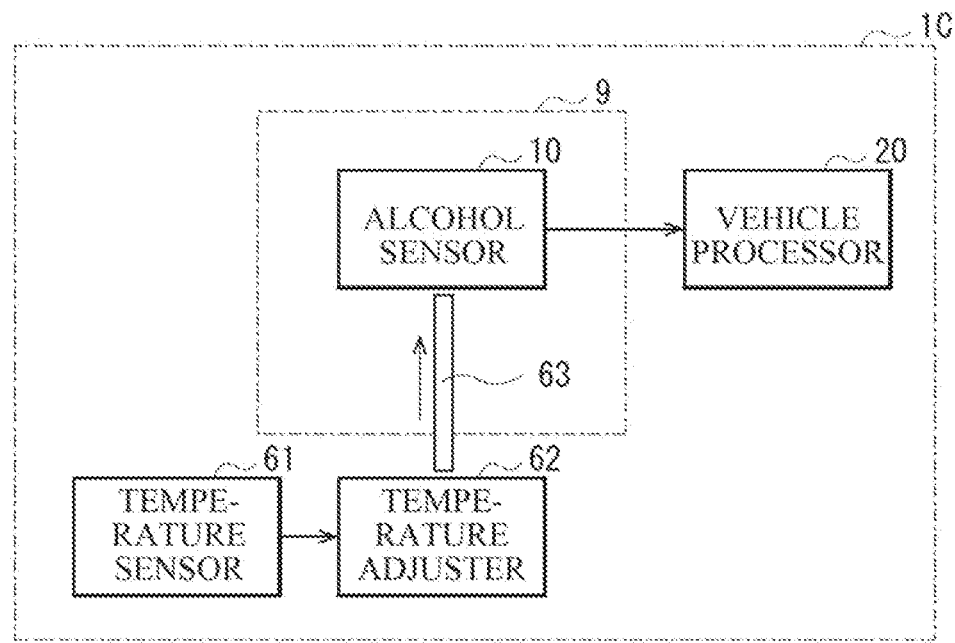
FIG. 7 is a block diagram illustrating a configuration example of a vehicle according to a modification example.

FIG. 7 illustrates a configuration example of example components related to the alcohol sensor 10 in the vehicle 1C. The vehicle 1C may include a temperature sensor 61, a temperature adjuster 62, and an air duct 63.

The temperature sensor 61 may be configured to detect a temperature of the vehicle compartment of the vehicle 1C.

The temperature adjuster 62 may be an air conditioner of the vehicle 1C. The temperature adjuster 62 may be configured to so adjust, based on a set temperature set by the occupant and a result of the detection performed by the temperature sensor 61, the temperature of the vehicle compartment that the temperature of the vehicle compartment becomes the set temperature by blowing out, from the outlet 43, the air whose temperature has been adjusted.

The air duct 63 may have a tube shape. The air duct 63 may be configured to flow a part of the air warmed or cooled by the temperature adjuster 62 toward the alcohol sensor 10.

Figure 8:
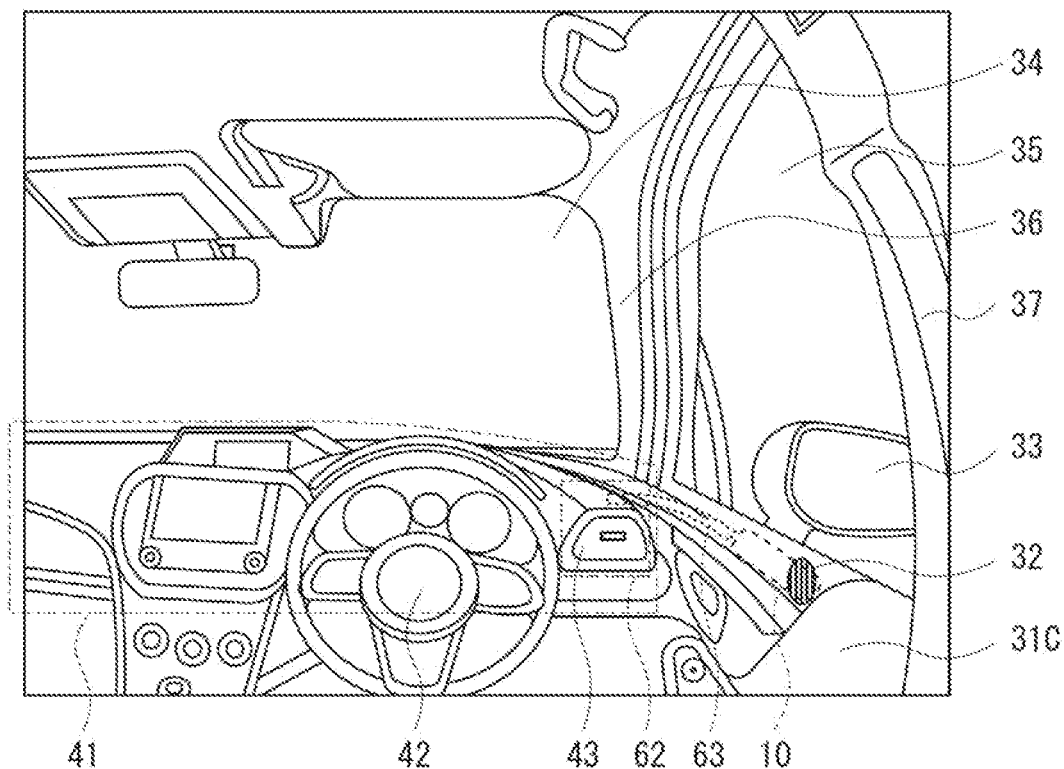
FIG. 8 is an explanatory diagram illustrating a configuration example of a vehicle compartment of the vehicle illustrated in FIG. 7.

FIG. 8 illustrates an example configuration of the vehicle compartment of the vehicle 1C. In this modification example, although it is not limited thereto, the alcohol sensor 10 and the air duct 63 may be provided inside the door 31C.

Figure 9:
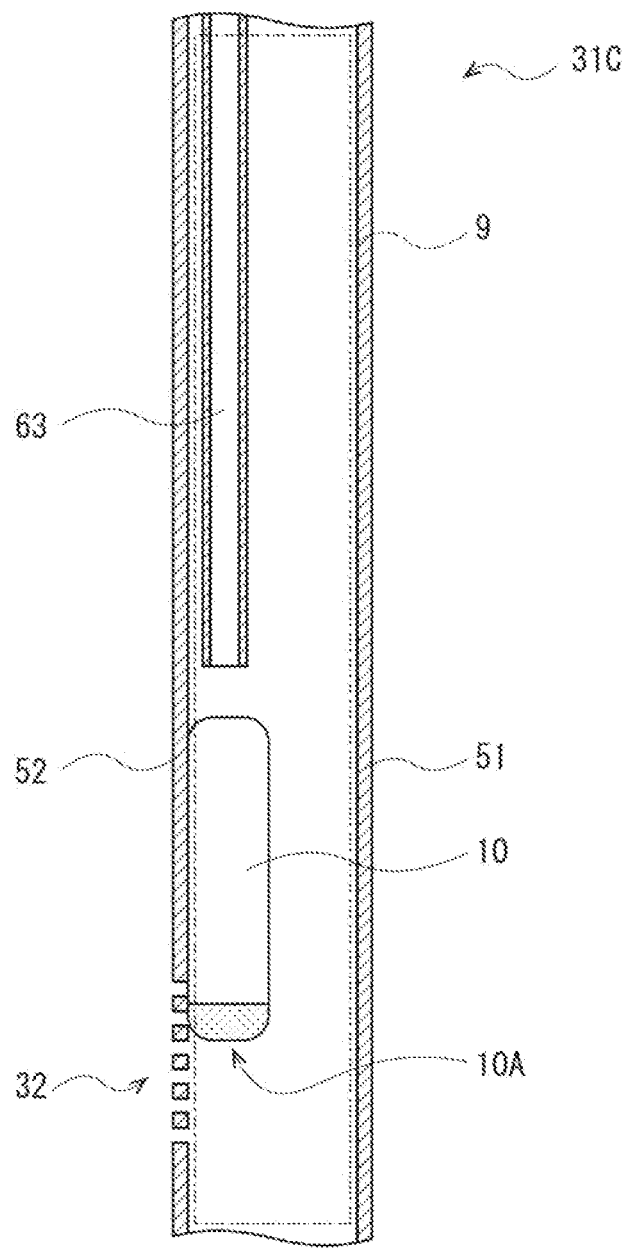
FIG. 9 is a cross-sectional diagram illustrating a configuration example of a door illustrated in FIG. 8.

FIG. 9 illustrates locations of the air duct 63 and the alcohol sensor 10 in the door 31C. The air duct 63 and the alcohol sensor 10 may be provided in the space 9 between the outer panel 51 and the inner panel 52. As illustrated in FIG. 8, one end of the air duct 63 may be guided to the temperature adjuster 62 provided inside the dashboard 41, and the other end of the air duct 63 may be guided to the alcohol sensor 10 as illustrated in FIG. 9. The air duct 63 may flow a part of the air warmed or cooled by the temperature adjuster 62 toward the alcohol sensor 10. Thus, the temperature adjuster 62 may adjust the temperature of the alcohol sensor 10.

As illustrated in FIG. 9, the alcohol sensor 10 may be provided in the space 9 between the outer panel 51 and the inner panel 52. The air duct 63 may cause a part of the air whose temperature has been adjusted by the temperature adjuster 62 to flow to the alcohol sensor 10. Thus, the temperature adjuster 62 may adjust the temperature of the alcohol sensor 10. For example, after the driver of the vehicle 1C sits on the driver's seat, the driver may blow a breath into the inlet 32 provided on the inner panel 52 without directly touching the alcohol sensor 10. Accordingly, the alcohol sensor 10 may detect the alcohol component included in the exhaled breath of the driver. Based on the result of the detection performed by the alcohol sensor 10, the vehicle processor 20 may allow the vehicle 1C to travel when the amount of the alcohol component included in the exhaled breath of the driver is equal to or less than the predetermined amount, and may prevent the vehicle 1C from traveling when the amount of the alcohol component included in the exhaled breath of the driver is greater than the predetermined amount.

In the present modification example, one end of the air duct 63 may be guided to the temperature adjuster 62 provided inside the dashboard 41 as illustrated in FIG. 8, but any embodiment of the disclosure is not limited thereto. In some embodiments, one end of the air duct 63 may be guided to a location, in the vicinity of the outlet 43, at which the air blown out from the outlet 43 flows. In this case, the air duct 63 may be warmed or cooled by the temperature adjuster 62, making it possible to cause a part of the air blown out from the outlet 43 to flow to the alcohol sensor 10.

Figure 10:
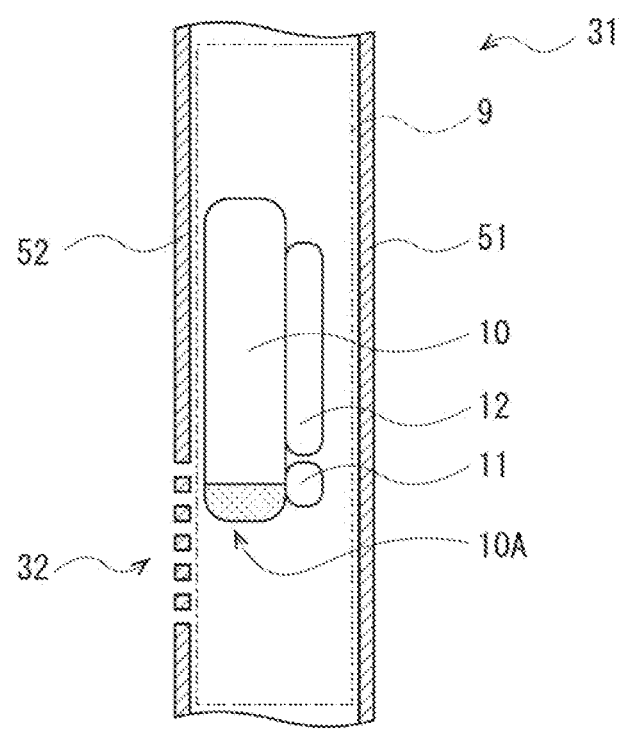
FIG. 10 is a cross-sectional diagram illustrating a configuration example of the door according to a modification example.

In the above-described example embodiment, the alcohol sensor 10 may be so disposed as to be in contact with the inner panel 52, but any embodiment of the disclosure is not limited thereto. In some embodiments, the alcohol sensor 10 may be so disposed as to be spaced apart from the inner panel 52 as illustrated in FIG. 10.

The techniques according to the example embodiment and its modification examples described above may be combined in any combination unless any contradiction occurs.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the above example embodiment and its modification examples, the technology may be applied to the vehicle having a driver's seat on the right side, but any embodiment of the disclosure is not limited thereto. In some embodiments, the technology may be applied to a vehicle having a driver's seat on the left side.

The example effects described herein are merely examples, and effects of the disclosure are not limited to the effects described herein. Accordingly, any other effect may be achieved by any embodiment of the disclosure.

It is possible to achieve at least the following configurations from the foregoing example embodiment and its modification examples of the disclosure.

(1)

A vehicle including:

an outer panel opposed to outside of the vehicle;

an inner panel opposed to a vehicle compartment of the vehicle and having an opening; and an alcohol sensor provided in a space between the outer panel and the inner panel and spaced apart from the outer panel, and configured to detect an alcohol component included in exhaled breath of an occupant of the vehicle, in which the opening is provided on the inner panel at a location corresponding to the alcohol sensor, and couples the vehicle compartment and the space.

(2)

The vehicle according to (1), further including:

a temperature sensor provided in the space and configured to perform a detection of a temperature of the alcohol sensor; and a temperature adjuster provided in the space and configured to adjust the temperature of the alcohol sensor, based on a result of the detection performed by the temperature sensor.

(3)

The vehicle according to (1) or (2), in which the outer panel includes a panel of an outer surface of a door of the vehicle, and the inner panel includes a panel of an inner surface of the door of the vehicle.

(4)

The vehicle according to (1) or (2), in which the inner panel includes a panel of a dashboard of the vehicle.

(5)

The vehicle according to any one of (1) to (4), further including a processor configured to control the vehicle, and allow the vehicle to travel when an amount of the alcohol component is equal to or less than a predetermined amount, and prevent the vehicle from traveling when the amount of the alcohol component is greater than the predetermined amount.

The vehicle processor 20 illustrated in FIGS. 2 and 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle processor 20 illustrated in FIGS. 2 and 7.

The invention claimed is:

1. A vehicle comprising:

an outer panel opposed to outside of the vehicle;

an inner panel opposed to a vehicle compartment of the vehicle and having an opening;

an alcohol sensor provided in a space between the outer panel and the inner panel and spaced apart from the outer panel, a temperature sensor provided in the space and configured to perform a detection of a temperature of the alcohol sensor;

when the temperature of the alcohol sensor detected by the temperature sensor is within a predetermined temperature range, the alcohol sensor being configured to:

(i) receive, via the opening in the inner panel, exhaled breath of an occupant of the vehicle from the vehicle compartment, and (ii) measure an amount of an alcohol component included in the exhaled breath of the occupant of the vehicle, when the temperature of the alcohol sensor detected by the temperature sensor is not within the predetermined temperature range such that the temperature of the alcohol sensor needs to be increased or decreased to allow for a high detection accuracy, the alcohol sensor being refrained from operating, and a processor that controls the vehicle, allows the vehicle to travel when an amount of the alcohol component measured by the alcohol sensor is equal to or less than a predetermined amount, and prevents the vehicle from traveling when the amount of the alcohol component measured by the alcohol sensor is greater than the predetermined amount, wherein the opening is provided on the inner panel at a location corresponding to the alcohol sensor, and couples the vehicle compartment and the space.

2. The vehicle according to claim 1, further comprising:

a temperature adjuster provided in the space and configured to adjust the temperature of the alcohol sensor, based on a result of the detection performed by the temperature sensor, to maintain the temperature of the alcohol sensor within the predetermined temperature range that allows for the high detection accuracy.

3. The vehicle according to claim 1, wherein the outer panel comprises a panel of an outer surface of a door of the vehicle, and the inner panel comprises a panel of an inner surface of the door of the vehicle.

4. The vehicle according to claim 1, wherein the inner panel comprises a panel of a dashboard of the vehicle.

5. The vehicle according to claim 1, wherein a driver of the vehicle blows a breath into the opening provided on the inner panel other than directly touching the alcohol sensor after the driver sits on a driver's seat of the vehicle.

6. The vehicle according to claim 1, wherein the alcohol sensor is spaced apart from the outer panel such that an influence of a temperature outside the vehicle on a temperature of the alcohol sensor is suppressed.

7. The vehicle according to claim 2, wherein the temperature adjuster comprises a thermoelectric conversion device configured to, heat the alcohol sensor to increase the temperature of the alcohol sensor, and cool the alcohol sensor to decrease the temperature of the alcohol sensor.

* * * * *